(12) United States Patent
Lind (10) Patent No.: US 10,525,893 B2
(45) Date of Patent: Jan. 7, 2020

(54) MIDDLE CONSOLE FOR VEHICLE PASSENGER COMPARTMENT

(71) Applicant: VOLKSWAGEN AG, Wolfsburg (DE)

(72) Inventor: Riley Lind, Ooltewah, TN (US)

(73) Assignee: Volkswagen AG (DE)

(*) Notice: Subject to any disclaimer, the term of this patent is extended or adjusted under 35 U.S.C. 154(b) by 90 days.

(21) Appl. No.: 15/874,920

(22) Filed: Jan. 19, 2018

(65) Prior Publication Data

US 2019/0225159 A1     Jul. 25, 2019

(51) Int. Cl.
```
B60R 11/06    (2006.01)
B60R 7/04     (2006.01)
B60N 2/14     (2006.01)
B60N 2/01     (2006.01)
```

(52) U.S. Cl.
CPC ............... *B60R 7/04* (2013.01); *B60N 2/01* (2013.01); *B60N 2/143* (2013.01)

(58) Field of Classification Search
CPC ............... B65D 50/041; B65D 83/206; B65D 2215/04; B29C 66/71; B29K 2027/18; B60R 2011/0005; B60R 11/0205; B60R 11/0211; B60K 2350/941; B60K 37/04
USPC ................... 296/37.14, 37.15, 37.8
See application file for complete search history.

(56) References Cited

U.S. PATENT DOCUMENTS

| | | | |
|---|---|---|---|
| 3,136,461 A * | 6/1964 | Gregg, Jr. ............... | B60N 3/103 224/540 |
| 3,356,409 A * | 12/1967 | Belsky ................... | B60N 2/793 296/24.34 |
| 3,572,818 A * | 3/1971 | Lohr ....................... | B60N 2/045 248/396 |
| 6,003,927 A * | 12/1999 | Korber .................... | B60R 7/04 296/37.8 |
| 6,026,646 A | 2/2000 | Hansen et al. | |
| 6,135,529 A * | 10/2000 | De Angelis ............... | B60R 7/04 296/37.8 |
| 6,152,522 A * | 11/2000 | Boulay ................... | B60H 1/247 296/208 |
| 6,203,088 B1 * | 3/2001 | Fernandez ................ | B60R 7/04 296/37.8 |
| 6,367,857 B2 * | 4/2002 | Kifer ........................ | B60R 7/04 296/24.34 |
| 6,428,072 B1 * | 8/2002 | Moore .................... | B60K 37/00 224/483 |
| 6,494,527 B1 * | 12/2002 | Bischoff ............ | B60H 1/00985 296/208 |
| 6,726,267 B2 * | 4/2004 | Kim ........................ | B60R 7/04 296/24.34 |
| 6,752,444 B2 * | 6/2004 | Kitano ..................... | B60R 7/04 296/184.1 |
| 6,869,121 B2 * | 3/2005 | Kayumi ................... | B60N 2/01 296/37.15 |

(Continued)

FOREIGN PATENT DOCUMENTS

DE       4340675 A1     6/1995
DE       4432369 A1     3/1996

(Continued)

*Primary Examiner* — Kiran B Patel
(74) *Attorney, Agent, or Firm* — Barnes & Thornburg LLP (57) ABSTRACT

A vehicle includes a passenger compartment containing several passenger seats. A middle console is provided on the floor of the vehicle in a space formed between two of the passenger seats.

25 Claims, 6 Drawing Sheets

(56) References Cited

U.S. PATENT DOCUMENTS

| | | | | |
|---|---|---|---|---|
| 7,401,831 B2* | 7/2008 | Sturt | ............... | B60R 7/04 224/275 |
| 7,413,229 B2* | 8/2008 | Kukucka | ............... | B60N 3/101 296/24.34 |
| 7,416,235 B2* | 8/2008 | Rajappa | ............... | B60R 7/04 296/24.34 |
| 7,481,475 B1* | 1/2009 | Lim | ............... | B60R 7/04 296/24.34 |
| 7,591,498 B2* | 9/2009 | Busha | ............... | B60N 3/101 296/24.34 |
| 8,919,847 B2* | 12/2014 | Mather | ............... | B60R 7/04 296/24.34 |
| 9,156,407 B1* | 10/2015 | Kramer | ............... | B60R 7/04 |
| 2003/0197392 A1* | 10/2003 | Clark | ............... | B60N 3/102 296/24.34 |
| 2003/0234550 A1* | 12/2003 | Brooks | ............... | B60R 7/04 296/24.46 |
| 2005/0146171 A1* | 7/2005 | Morabito | ............... | B60N 2/01 297/188.01 |
| 2005/0249356 A1* | 11/2005 | Holmi | ............... | B60R 11/0217 381/86 |
| 2007/0158979 A1* | 7/2007 | Saberan | ............... | B60N 2/01558 297/47 |
| 2007/0205623 A1* | 9/2007 | Hung | ............... | B60H 1/00564 296/24.34 |
| 2009/0026197 A1 | 1/2009 | Chou et al. | | |
| 2009/0224563 A1* | 9/2009 | Gregory | ............... | B60R 11/00 296/1.07 |
| 2010/0123328 A1* | 5/2010 | Sluis | ............... | B60R 7/04 296/37.8 |
| 2010/0156128 A1* | 6/2010 | Dexter | ............... | B60N 2/305 296/24.34 |
| 2011/0127791 A1* | 6/2011 | Penner | ............... | B60R 7/04 296/24.34 |
| 2018/0297500 A1* | 10/2018 | Singh | ............... | B60N 3/105 |

FOREIGN PATENT DOCUMENTS

| | | |
|---|---|---|
| DE | 19650767 A1 | 7/1998 |
| DE | 10321837 A1 | 12/2004 |
| DE | 202004003844 U1 | 7/2005 |
| DE | 102006003868 A1 | 8/2007 |
| DE | 102009055834 A1 | 6/2011 |
| DE | 202015102995 U1 | 6/2015 |
| EP | 1110810 A2 | 6/2001 |
| WO | 0136226 A2 | 5/2001 |

* cited by examiner

MIDDLE CONSOLE FOR VEHICLE PASSENGER COMPARTMENT

BACKGROUND

The present disclosure relates to vehicles and in particular to passenger compartment in vehicles. More particularly, the present disclosure relates to consoles between seats in vehicle passenger compartments.

SUMMARY

A vehicle passenger compartment in accordance with the present disclosure includes a floor and one or more passenger seats above the floor. In illustrative embodiments, a storage console is provided for use by a passenger seated in an adjacent passenger seat.

In illustrative embodiments, the vehicle passenger compartment includes a passenger-seating system having a front seating row comprising first and second front seats and a first rear seating row comprising first and second rear seats. The seats in each row are laterally spaced apart from one another to provide a console-receiving space therebetween.

In illustrative embodiments, a collapsible first rear console in accordance with the present disclosure is located in the console-receiving space provided between the first and second rear seats. The collapsible first rear console has a shape that can be varied by a seat passenger to cause the first rear console to be transformed in the field from a relatively tall expanded-use configuration to a relatively shorter collapsed compact-storage configuration. In the compact-storage configuration, the top of the first rear console is near to the underlying floor in the vehicle passenger compartment so that a seat passenger can step over the collapsed first rear console and pass relatively easily through the console-receiving space provided between the first and second rear seats to reach rear spaces in the vehicle passenger compartment.

In illustrative embodiments, the collapsible first rear console includes a foundation arranged to lie along the floor, a movable top cap, and a cap mover arranged to interconnect the foundation and the movable top cap. The cap mover can be operated by a seat passenger or other person either to raise the top cap upwardly away from the foundation to establish the expanded-use configuration of the first rear console or to lower the top cap downwardly toward the foundation to establish the collapsed compact-storage configuration of the first rear console. In the expanded-use configuration, the movable top cap of the first rear console lies in an elevated position above the seat-supporting floor to establish a console mode of the first rear console and provide a barrier to hinder movement of a seat passenger through the console-receiving space provided between the first and second rear seats. In the collapsed compact-storage configuration, the movable top cap of the first rear console lies in a collapsed low-profile position along the floor to establish a step-over (pass-through) mode of the first rear console and provide an occupant transit passageway between the first and second rear seats to allow free movement of people through the first console-receiving space above the top cap.

In illustrative embodiments, the cap mover includes one or more foldable linkages that interconnect the movable top cap and the underlying foundation and control up-and-down movement of the movable top cap relative to the foundation during a configuration change of the first rear console. The cap mover also includes one or more linkage stabilizers (e.g. rigid bars) that can be arranged to block downward movement of the movable top cap toward the foundation so that the first rear console remains in its expanded-use configuration. Each linkage stabilizer can be pivoted about a horizontal pivot axis on the movable top cap to disengage the foundation to allow the foldable linkages to fold and the top cap to move toward the foundation to establish the compact-storage configuration of the first rear console.

In illustrative embodiments, the foundation can be decoupled from the underlying floor by a passenger to allow the passenger to remove the first rear console from the console-receiving space provided between the first and second rear seats so that the first rear console can be removed from the vehicle or positioned in a new location in the vehicle passenger compartment. It is within the scope of the present disclosure to provide a first fold linkage at one end of the first rear console, a second fold linkage at an opposite end of the first rear console, and a separate linkage stabilizer for each of the fold linkages. Each linkage stabilizer is allowed to pivot about its own pivot axis upon disengagement from the foundation so that the free ends of the two linkage stabilizers can be moved upwardly away from the foundation and top cap by the passenger to lie near one another above the movable top cap and cooperate to provide a carry handle to facilitate transport of the console away from the vehicle and establish a picnic mode of the console.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a diagrammatic perspective view of a passenger compartment in a vehicle showing that a collapsible (variable-shape) rear middle console in accordance with the present disclosure is located between pairs of laterally spaced apart passenger seats in each of the first and second rear seating rows in the passenger compartment of the vehicle while a rigid middle console is located between first and second seats in the front seating row of the vehicle and showing that: (1) the collapsible first rear middle console has been expanded by a passenger to assume a relatively tall expanded-use configuration to establish a console mode in which a passenger can use the first rear middle console to hold cups, bags, and other items and in which that console serves as a barrier to hinder movement of an occupant of the vehicle passenger compartment between the first and second rear cross aisles provided in the passenger compartment through a space provided between those first and second rear seats in a center aisle of the vehicle and (2) the collapsible second rear middle console has been contracted by a passenger to assume a relatively shorter collapsed compact-storage configuration to establish a step-over (pass-through) mode in which an occupant transit passageway is provided above the collapsed second rear middle console between the second rear cross aisle and an aft rear cargo storage region through a space provided between third and fourth rear seats so as to allow relatively free movement of a vehicle passenger along the center aisle and over the relatively shorter collapsed second rear middle console to access the rear cargo storage region in the passenger compartment;

FIG. 6 is a side-elevation view of a first embodiment of the collapsible first rear middle console of FIG. 1 in a console mode in which the top cap is in the elevated position and showing that the console includes a foundation, a top cap, and a cap mover comprising a first-end fold linkage, a first linkage stabilizer, a second-end fold linkage, and a second linkage stabilizer, and showing that the fold linkages are arranged to lie in spaced-apart parallel relation to one another and extend between the foundation and the overlying top cap, the first linkage stabilizer is inclined in a positively sloping direction, the second linkage stabilizer is inclined in a negatively sloping direction; and the first and second linkage stabilizers cooperate to rigidify the collapsible first rear middle console to maintain that console in an expanded-use configuration to establish the console mode;

FIG. 12 shows that the anchor connector includes a pivot base coupled to one end of the foundation and a releasable mount grip coupled to an opposite end of the foundation and shows that the pivot base of the anchor connector of FIG. 11 is mounted on the rear mount of the console anchor for pivotable movement about a horizontal pivot axis and the releasable mount grip of the anchor connector is arranged to lie above and in spaced-apart relation to an underlying front mount of the console anchor;

FIG. 13 is a side-elevation view similar to FIG. 12 (omitting the top cap and cap mover) after clockwise pivotable movement of the pivot base of the anchor connector about the horizontal pivot axis to engage the releasable mount grip of the anchor connector with the front mount of the console anchor;

FIG. 14 is a side-elevation view similar to FIGS. 12 and 13 (omitting the top cap and cap mover) showing that the releasable mount grip of the anchor connector has changed from the front-mount release mode shown in FIG. 13 to a front-mount retention mode shown in FIG. 14.

DETAILED DESCRIPTION

Figure 1:
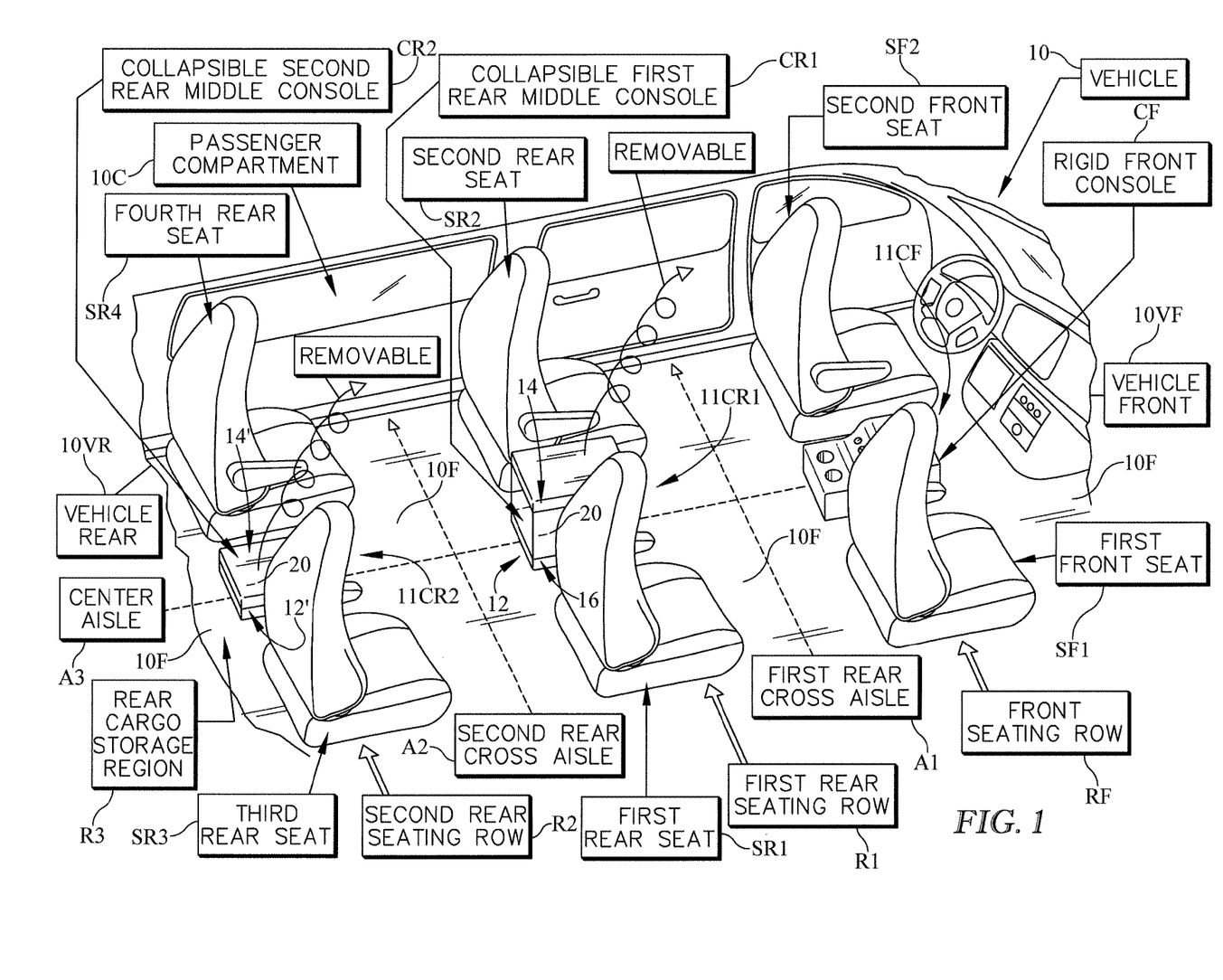

A collapsible first rear console CR1 in accordance with the present disclosure can be mounted in a passenger compartment 10C on a floor 10F of a vehicle 10 in a position to lie between first and second rear seats SR1, SR2 and along a center aisle A3 of vehicle 10 as shown in FIG. 1. At the option of a passenger, the collapsible first rear console CR1 can be reconfigured as suggested in FIGS. 3-5 to change in shape from a relatively tall expanded-use configuration shown in Figs. and 3 to a relatively shorter collapsed compact-storage configuration shown in FIG. 5. Once compacted, it is easy for a passenger sitting on one of the first or second rear seats SR1, SR2 in a first rear seating row R1 in passenger compartment 10C to step over the collapsed first rear console CR1 to access an aft second rear seating row R2 in passenger compartment 10C. It is also within the scope of the present disclosure to locate the collapsible first rear console CR1 in another passenger compartment 10C' of vehicle 10' at the intersection of a center aisle A3' and cross aisle A1' between four swivel seats S1, S2, S3, and S4 as suggested in FIG. 15.

A collapsible second rear console CR2 can be collapsed in accordance with the present disclosure to assume a collapsed compact-storage configuration as shown in FIG. 1. The collapsible second rear console CR2 is located along center aisle A3 between third and fourth rear seats SR3, SR4. By collapsing the collapsible second rear console CR2 toward floor 10F it is easy for a passenger sitting on one of the third and fourth rear seats SR3, SR4 in the aft second rear seating row R2 to step over the collapsed second rear console CR2 and pass through a space provided between third and fourth rear seats SR3, SR4 to access a rear cargo storage region R3 located behind the third and fourth rear seats SR3, SR4 in passenger compartment 10C.

Figures 2, 3, 4, 5:
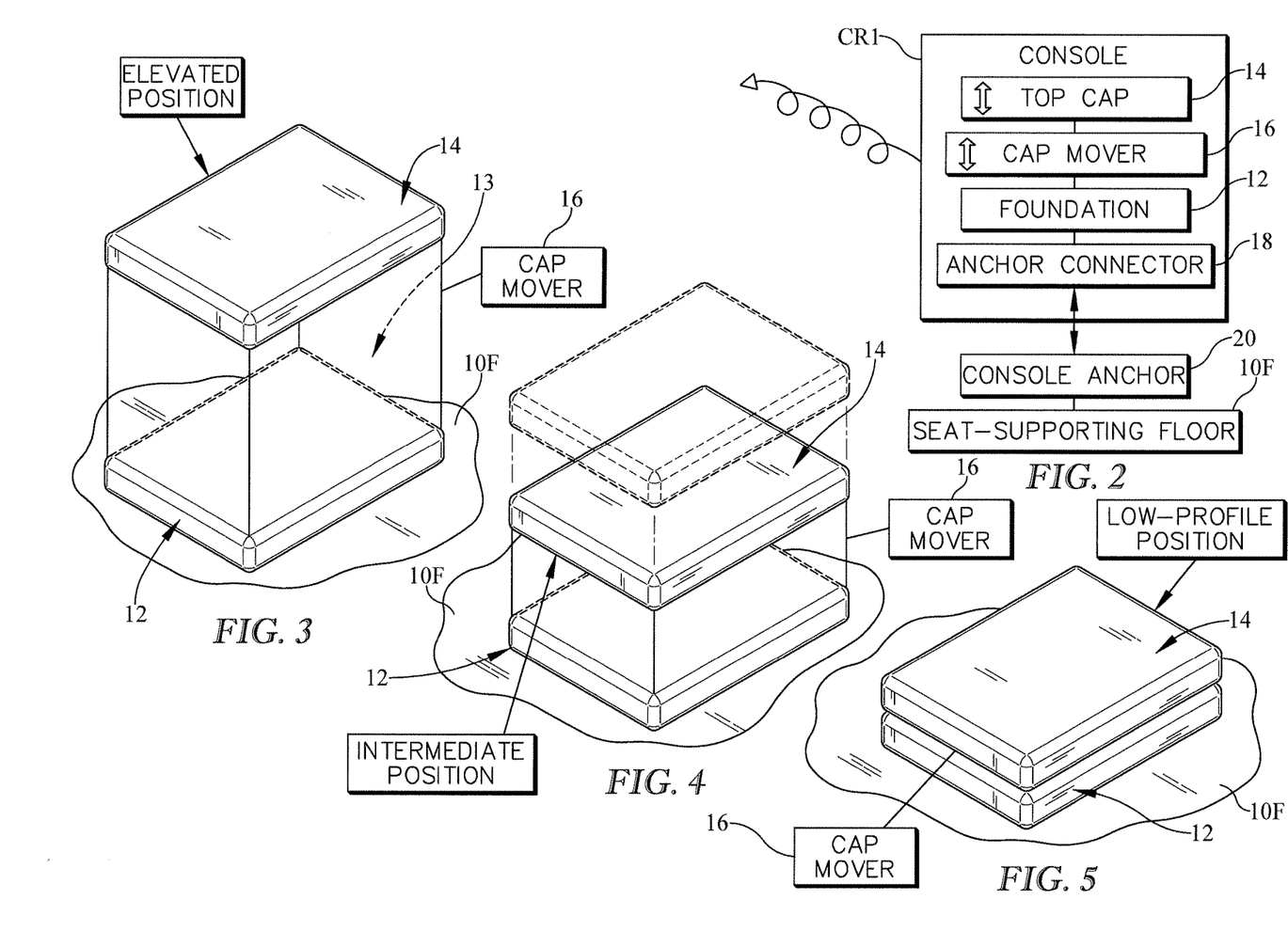
FIG. 2 is a diagrammatic view of the collapsible first rear middle console suggesting that the console includes a foundation, a top cap, and a cap mover that is arranged to interconnect the foundation and the overlying top cap and to control movement of the top cap relative to the foundation between elevated, intermediate, and low-profile positions as suggested in FIGS. 3-5 under the control of a passenger in the vehicle and suggesting that an anchor connector included in the console can be separated from a console anchor mounted on the floor to decouple the console from the floor.
FIG. 3 is a diagrammatic view of the collapsible first rear middle console in an expanded-use configuration as shown in FIG. 1 in which the top cap is supported by the cap mover in an elevated position above the underlying foundation to establish the console mode of the first rear middle console.
FIG. 4 is a diagrammatic view of the collapsible first rear middle console after use of the cap mover to lower the top cap toward the underlying foundation to assume an intermediate position above the foundation.
FIG. 5 is a diagrammatic view of the collapsible first rear middle console after use of the cap mover to lower the top cap further toward the underlying foundation to assume a collapsed low-profile position along the seat-supporting floor to establish a step-over (pass-through) mode in which an occupant transit passageway is provided above the top cap of the collapsed first rear middle console.

The collapsible first rear console CR1 has a variable shape that can be changed by a passenger as suggested in FIGS. 3-5. First rear console CR1 is shown in console mode in FIG. 3 and step-over (pass-through) mode in FIG. 4. Second rear console CR2 can be collapsed by a passenger in the same way to assume the step-over (pass-through) mode shown in FIG. 1. Each of the collapsible first and second rear consoles CR1, CR2 can be removed from passenger compartment 10C at the option of passenger in accordance with the present disclosure by decoupling an anchor connector 18 included in each rear console CR1, CR2 from a console anchor 20 mounted on floor 10F as suggested in FIGS. 2, 11, and 12-14. Each of first and second rear console CR1, CR2 can be converted by a passenger in accordance with the present disclosure from a console mode shown, for example, in FIGS. 3 and 6, to a picnic mode shown, for example, in FIG. 10.

As suggested diagrammatically in FIG. 2, collapsible first rear console CR1 comprises a foundation 12, a movable top cap 14, and a cap mover 16 arrange to lie between and interconnect foundation 12 and movable top cap 14. Collapsible first rear console CR1 also includes an anchor connector 18 mounted on the underside of foundation 12 and arranged to be coupled to and decoupled from a console anchor 20 mounted on floor 10F.

Figures 6, 7, 8:
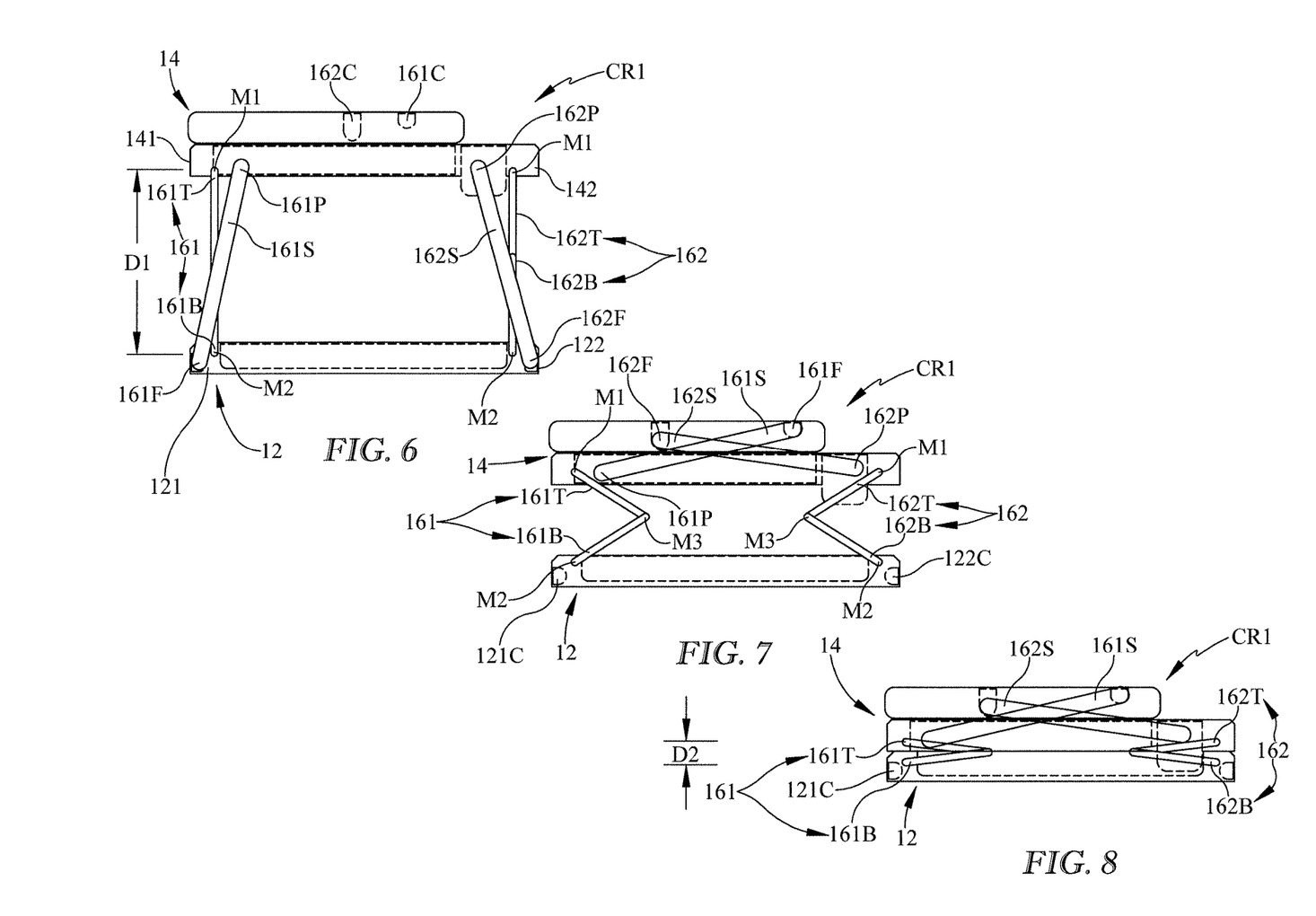
FIG. 7 is a view similar to FIG. 6 showing that the first and second linkage stabilizers have been pivoted about their respective horizontal pivot axes to cause free ends of those linkage stabilizers to disengage the foundation and engage the top cap to unrigidify the fold linkages to allow the fold linkages to fold during downward movement of the top cap toward the underlying foundation.
FIG. 8 is a view similar to FIGS. 6 and 7 showing that the top cap has been moved downwardly to engage the underlying foundation to assume a collapsed low-profile position in the collapsed compact-storage configuration of the console while free ends of the linkage stabilizers continue to engage the top cap to establish the step-over (pass-through) mode.

By operating cap mover 16 in a manner shown diagrammatically in FIGS. 3-5 and illustratively in FIGS. 6-8, a passenger can move the movable top cap 14 relative to foundation 12 from an elevated position shown in FIGS. 3 and 6 that is associated with the expanded-use configuration of collapsible first rear console CR1 to a low-profile position shown in FIGS. 5 and 8 that is associated with a relatively shorter compact-storage configuration of collapsible first rear console CR1. In this way, the collapsible first rear console CR1 is changed from a console mode shown in FIGS. 3 and 6 to a step-over (pass-through) mode shown in FIGS. 5 and 8.

Figures 9, 10:
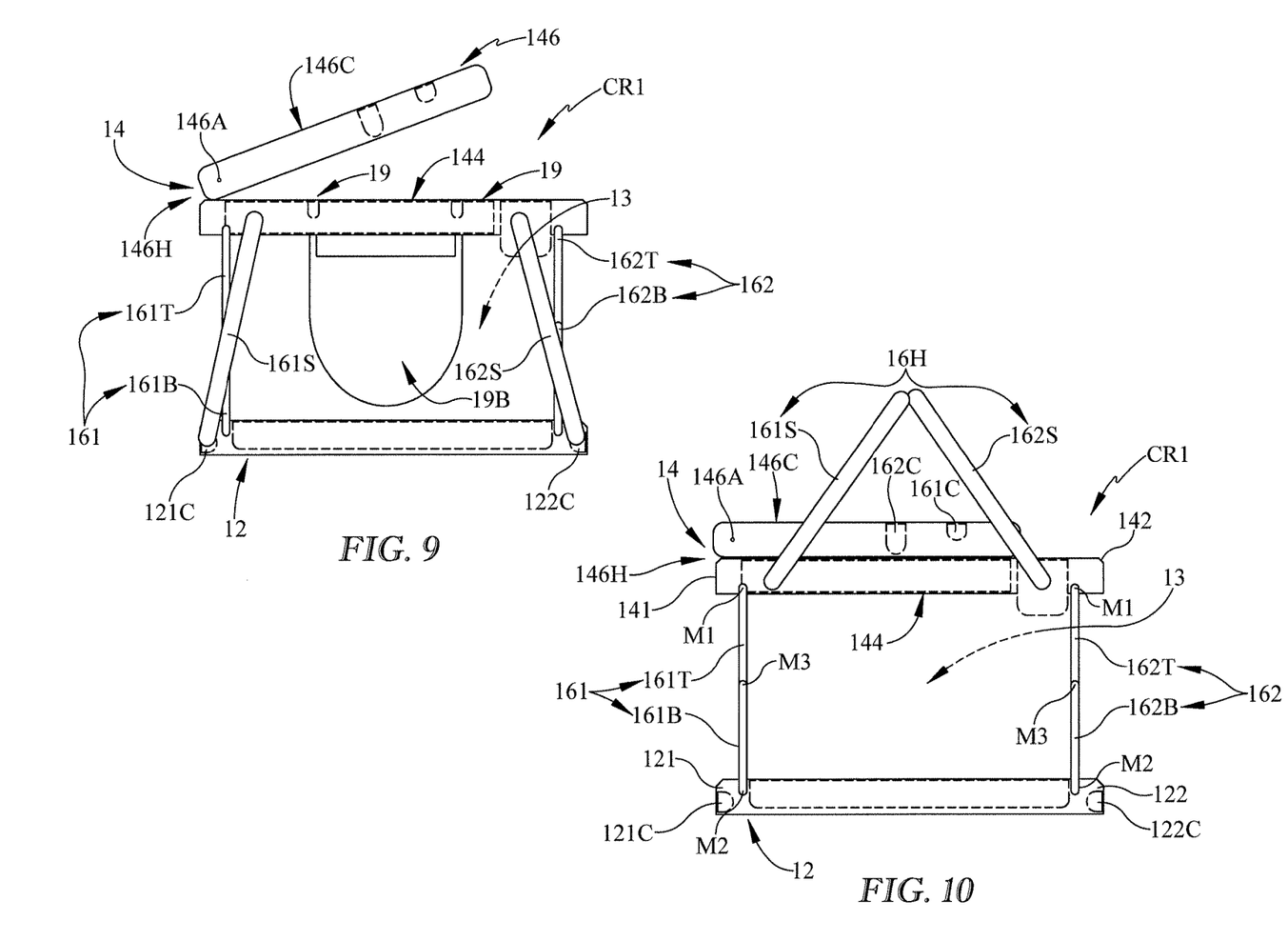
FIG. 9 is a view similar to FIG. 6 showing that a pivotable lid included in the top cap can be pivoted to an opened position away from a lid frame also included in the top cap while the first rear console is in console mode to expose a top aperture opening into an interior item-storage region of the console while the linkage stabilizers remain in their console-rigidifying positions in which free ends of the linkage stabilizers engage the foundation of the console.
FIG. 10 is a view similar to FIG. 6 showing the console in a picnic mode after pivoting each of the linkage stabilizers has been pivoted about a companion horizontal pivot axis so that the free ends of the linkage stabilizers are located near one another and above the top cap and cooperate to provide a carry handle.

In the expanded-use configuration (i.e. console mode), the passenger can store items (not shown) in an interior item-storage region 13 formed in first rear console CR1 between foundation 12 and movable top cap 14 by, for example, opening a lid 14L included in movable top cap 14 to access interior item-storage region 13 as suggested in FIG. 9. In the collapsed compact-storage configuration (i.e. step-over mode) shown in FIG. 5, movable top cap 14 has been lowered to a low-profile position that is very close to floor 10F so that a passenger can easily step over the lowered movable top cap 14 to increase pass-through mobility of that passenger between seating rows R1, R2, R3 along center aisle A3 in passenger compartment 10C as suggested in FIG. 1.

As suggested in FIG. 1, vehicle passenger compartment 10C also includes a front seating row RF located near a vehicle front 10VF. Front seating row RF includes first and second front seats SF1, SF2 and a rigid front console CF located between front seats SF1, SF2. It is within the scope of the present disclosure to replace rigid front console CF with one of the collapsible first or second rear consoles CR1, CR2. In illustrative embodiments, all of the consoles CF, CR1, and CR2 extend along a center aisle A3 of passenger compartment 10C and lie in spaced-apart relation to one another. A first rear cross aisle A1 lies between front seats SF1, SF2 and intersects a forward portion of center aisle A3 as shown in FIG. 1. A second rear cross aisle A2 lies between rear seats SR1, SR2 in first rear seating row R1 and rear seats SR3, SR4 in second rear seating row R2 and intersects a rearward portion of center aisle A3 as also shown in FIG. 1.

A vehicle passenger compartment 10C of a vehicle 10 includes a seat-supporting floor 10F, a passenger-seating system 101 lying above floor 10F, and a console system 102 as suggested in FIG. 1. Console system 102 comprises consoles CF, CR1, and CR2 as suggested in FIG. 1.

Passenger-seating system 101 includes a front seating row RF and a first rear seating row R1 lying aft of front seating row RF as shown, for example, in FIG. 1. Front seating row RF comprises first and second front seats SF1, SF2 coupled to floor 10F and arranged to lie in laterally spaced-apart relation to one another to define a front console-receiving space 11CF therebetween as shown in FIG. 1. First rear seating row R1 comprises first and second rear seats SR1, SR2 coupled to floor 10F and arranged to lie in laterally spaced-apart relation to one another to define a first rear console-receiving space 11CR1 therebetween as shown in FIG. 1.

Console system 102 includes a rigid front console CF and a collapsible first rear console CR1 as suggested in FIG. 1. Rigid front console CF is mounted in a stationary position in the front console-receiving space 11CF to provide a barrier arranged to hinder movement of an occupant using the passenger-seating system 101 along the seat-supporting floor 10F through the front console-receiving space 11CF as shown, for example, in FIG. 1. Collapsible first rear console CR1 is located in the first rear console-receiving space 11CR1 provided between the first and second rear seats SR1, SR2.

The collapsible first rear console CR1 includes a foundation 12, a movable top cap 14, and cap mover 16 as shown diagrammatically in FIG. 2 and illustratively in FIG. 6. Cap mover 16 is configured to provide means for selectively moving the movable top cap 14 relative to foundation 12 and the seat-supporting floor 10F under foundation 12 at the option of a console shape-change operator (e.g. passenger) between an elevated position lying in spaced-apart relation to the seat-supporting floor 10F as suggested in FIGS. 3 and 6 to establish an expanded-use configuration (console mode) of the collapsible first rear console CR1 in which first rear console CR1 provides a barrier to hinder movement of an occupant using passenger-seating system 101 along the seat-supporting floor 10F through the first rear console-receiving space 11CR1 and a collapsed low-profile position lying along the seat-supporting floor 10F as suggested in FIGS. 5 and 8 to establish a collapsed compact-storage configuration (step-over or pass-through mode) of the collapsible first rear console CR1 to provide an occupant transit passageway between the first and second rear seats SR1, SR2 to allow free movement of an occupant using passenger-seating system 101 through the first rear console-receiving space 11CR1 along the seat-supporting floor 10F above top cap 14.

Figure 11:
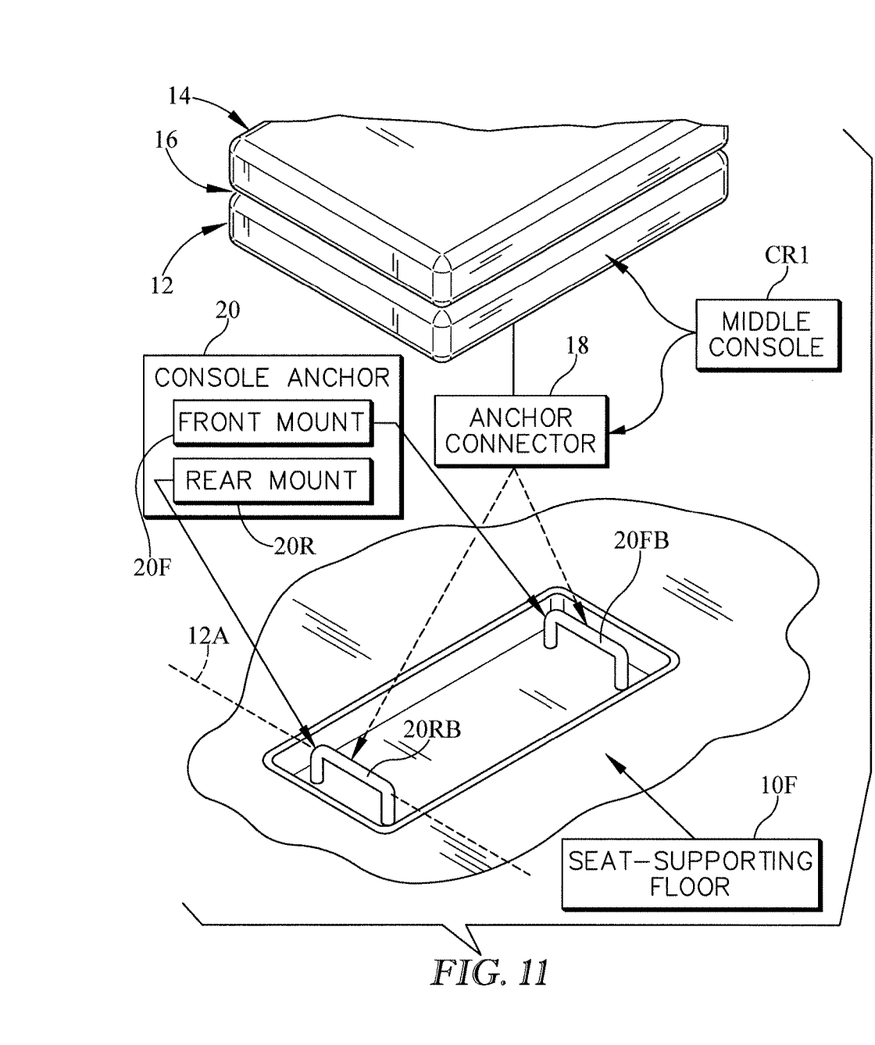
FIG. 11 is an exploded perspective assembly view of an illustrative console, console anchor, and seat-supporting floor of the type shown diagrammatically in FIG. 2 and suggesting that the console anchor comprises a stationary front mount and a separate stationary rear mount that are arranged to mate with the overlying console anchor to hold the foundation of the console in an anchored position on the seat-supporting floor.

Console system 102 further includes a first console anchor 20 mounted in a stationary position on the seat-supporting floor 10F as suggested diagrammatically in FIG. 2 and illustratively in FIG. 11. First console anchor 20 is located in first rear console-receiving space 11CR1 and configured to mate with first rear console CR1 as suggested in FIG. 1. A second console anchor 20 is located in second rear console-receiving space 11CR2 and configured to mate with second rear console CR2 as suggested in FIG. 1.

The collapsible first rear console CR1 further includes a releasable anchor connector 18 coupled to foundation 12 as suggested diagrammatically in FIG. 2 and illustratively in FIG. 2. The releasable anchor connector 18 is configured to provide connector means for engaging the first console anchor 20 to locate foundation 12 in a stationary position in the first-rear console-receiving space 11CR1 relative to the seat-supporting floor 10F and for disengaging the first console anchor 20 at the option of an occupant using the passenger-seating system 101 to free foundation 12 to be moved away from the stationary position on seat-supporting floor 10F so that the collapsible first rear console CR1 can be relocated to a new position relative to the seat-supporting floor 10F.

Passenger-seating system 101 further includes a second rear seating row R2 arranged to lie in spaced-apart relation to the front seating row RF to locate the first rear seating row R1 therebetween as shown, for example, in FIG. 1. Second rear seating row R2 comprises third and fourth rear seats SR3, SR4 coupled to the seat-supporting floor 10F. Third and fourth rear seats SR3, SR4 are arranged to lie in laterally spaced-apart relation to one another to define a second rear console-receiving space 11CR2 therebetween.

Console system 102 further includes a collapsible second rear console CR2 is similar in form and function to first rear consoled CR1 and located in the second rear console-receiving space 11CR2 provided between the third and fourth rear seats SR3, SR4 as shown, for example, in FIG. 1. The collapsible second rear console CR2 is similar in form and function to first rear console CR1 and includes a second foundation 12', a movable second top cap 14', and a second cap mover 16' as shown in FIG. 1. Second cap mover 16' is configured to provide means for selectively moving the movable second top cap 14' relative to second foundation 12' between an elevated position lying in spaced-apart relation to the seat-supporting floor 10F to establish an expanded-use configuration (console mode) of the collapsible second rear console CR2 that provides a barrier to hinder movement of an occupant using passenger-seating system 101 along the seat-supporting floor 10F through the second rear console-receiving space 11CR2 and a collapsed low-profile position lying along the seat-supporting floor 10F as shown in FIG. 1 to establish a collapsed compact-storage configuration (step-over or pass-through mode) of the collapsible second rear console CR2 to provide an occupant transit passageway between third and fourth rear seats SR3, SR4 to allow free pass-through movement of an occupant using passenger-seating system 101 through the second rear console-receiving space 11CR2 along the seat-supporting floor 10F above second top cap 14'.

Cap mover 16 of first rear console CR1 includes a first-end fold linkage 161 having a top mount M1 pivotably coupled to a first end 141 of the top cap 14 and a bottom mount M2 pivotably coupled to a companion first end 121 of the foundation 12 as suggested in FIGS. 6-8. First end 121 of foundation 12 is arranged to lie in close proximity to first end 14 of top cap 14 upon movement of top cap 14 to the collapsed low-profile position as shown in FIG. 8. Top and bottom mounts M1, M2 are separated by a first distance D1 when top cap 14 occupies the elevated position as shown in FIG. 6 and a relatively shorter second distance D2 when top cap 14 occupies the collapsed low-profile position as shown in FIG. 8.

Cap mover 16 further include a first linkage stabilizer 161S having a free end 161F and an opposite pivot end 161P as shown in FIGS. 6 and 7. Pivot end 161P is mounted on the first end 141 of top cap 14 for pivotable movement about a first horizontal pivot axis between a first linkage-stabilizing position in which free end 161F engages first end 121 of foundation 12 as shown in FIG. 6 to rigidify first-end fold linkage 161 and retain top cap 14 in the elevated position and other positions in which free end 161F disengages first end 121 of foundation 12 as shown in FIGS. 7 and 8 to unrigidify first-end fold linkage 161 to allow downward movement of top cap 14 from the elevated position shown in FIG. 6 to the collapsed low-profile position shown in FIG. 8. Free end 161F is arranged to extend into an outwardly opening end-receiving channel 121C formed in a perimeter end edge of first end 121 of foundation 12 when top cap 14 occupies the elevated position as suggested in FIGS. 6 and 9 (channel 121C is shown best in FIGS. 7 and 8 when empty).

Free end 161F of first linkage stabilizer 161S is arranged to lie in spaced-apart relation to foundation 12 in one of the other positions to locate top cap 14 therebetween and provide a carry handle 16H located above top cap 14 to establish a picnic mode as suggested in FIG. 10. The picnic mode is used, for example, when first rear console CR1 is removed from vehicle 10. Free end 161F of first linkage stabilizer 161S is arranged to extend into an end-receiver channel 161C formed in top cap 14 when top cap 14 occupies the collapsed low-profile position as shown in FIG. 8.

First-end fold linkage 161 includes a top link 161T and a bottom link 161B as shown in FIG. 6-10. Top link 161T includes the top mount M1 at one end and a pivot mount M3 in an opposite end as suggested in FIG. 10. Bottom link 161B includes the bottom mount M2 at one end and a pivot mount M3 at an opposite end as also suggested in FIG. 10. The pivot mounts M3, M3 are coupled to one another at a horizontal link-pivot axis as suggested in FIG. 10 to support top and bottom links 161T, 161B for pivotable movement relative to one another about the horizontal link-pivot axis to allow movement of the top mount M1 relative to bottom mount M2 during movement of top cap 14 relative to foundation 12 as shown, for example, in FIG. 6-8.

Top and bottom links 161T, 161B are arranged to extend along a line and lie in in-line relation to one another when top cap 14 occupies the elevated position as suggested in FIGS. 6, 9, and 10. Top and bottom links 161T, 161B are arranged to establish a first V-shape and cooperate to form a first acute angle therebetween having a first measure when top cap 14 is located in an intermediate position part way between the elevated and collapsed low-profile positions as suggested in FIG. 7. Top and bottom links are also arranged to establish a second V-shape and cooperate to form a second acute angle therebetween having a relatively smaller second measure when top cap 14 occupies the collapsed low-profile position as suggested in FIG. 8.

Top link 161T has a first length as suggested in FIG. 10. Bottom link 161B also has a length that is the same as the first length as suggested in FIG. 10. First linkage stabilizer 161S has a relatively longer second length as suggested in FIGS. 6 and 10.

First linkage stabilizer 161S has a length that is longer than a combined length of top and bottom links 161T, 161B when top and bottom links 161T, 161B are arranged to extend along a line and lie in an in-line relation to one another when top cap 14 occupies the elevated position as shown in FIG. 6. A similar relationship exists between second linkage stabilizer 162S and top and bottom links 162T, 162B of second-end fold linkage 162 as also shown in FIG. 6.

Foundation 12 has a first end 121 and an opposite second end 122 while top cap 14 has a first end 141 and an opposite second end 142 as shown in FIG. 10. Pivot end 161P of first linkage stabilizer 161S is arranged to lie on first end 141 of top cap 14 in a location between top mount M1 of first-end fold linkage 161 and second end 142 of top cap 14 as shown in FIG. 6. Bottom mount M2 of first-end fold linkage 161 is arranged to lie on first end 121 of foundation 12 in a location between free end 161F of first linkage stabilizer 161S and second end 122 of foundation 12 when free end 161F of first linkage stabilizer 161S engages first end 121 of foundation 12 and top cap 14 occupies the elevated position as also shown in FIG. 6.

First-end fold linkage 161 extends coextensively along a vertical line as shown in FIGS. 6 and 10. First linkage stabilizer 161S extends along a positively sloping line when top cap 14 occupies the elevated position and first rear console RC1 is in console mode as shown in FIG. 6.

Cap mover 16 further includes a second-end fold linkage 162 having a top mount M1 pivotably coupled to a second end 142 of top cap 14 and a bottom mount M2 pivotably coupled to a companion second end 122 of foundation 12 as shown in FIG. 6. Foundation 12 is arranged to lie in close proximity to second end 142 of top cap 14 upon movement of top cap 14 to the collapsed low-profile position as shown in FIG. 8. Top and bottom mounts M1, M2 are separated by a first distance D1 when top cap 14 occupies the elevated position as suggested in FIG. 6 and a relatively shorter second distance D2 when top cap 14 occupies collapsed low-profile position as suggested in FIG. 8.

Cap mover 16 further include a second linkage stabilizer 162S having a free end 162F and an opposite pivot end 162P. Pivot end 162P is mounted on second end 142 of top cap 14 for pivotable movement about a second horizontal pivot axis between a second linkage-stabilizing position in which free end 162F engages second end 122 of foundation 12 to rigidify second-end fold linkage 162 and retain top cap 14 in elevated position as suggested in FIG. 6 and other positions in which free end 162F disengages second end 122 of foundation 12 to unrigidify second-end fold linkage 162 to allow downward movement of top cap 14 from elevated position shown in FIG. 6 to collapsed low-profile position shown in FIG. 8. Free end 162F is arranged to extend into an outwardly opening end-receiving channel 122C formed in a perimeter end edge of second end 122 of foundation 12 when top cap 14 occupies the elevated position as shown in FIGS. 6 and 9.

Free end 162F of second linkage stabilizer 162S is arranged to lie in spaced-apart relation to foundation 12 in one of other positions to locate top cap 14 therebetween and cooperate with free end 161F of first linkage stabilizer 161S to provide a carry handle 16H located above top cap 14 as shown in FIG. 10. Free end 162F of second linkage stabilizer 162S is arranged to extend into an end-receiver channel 162C formed in top cap 14 when top cap 14 occupies the collapsed low-profile position.

Anchor connector 18 of first rear console CR1 can be mated with console anchor 20 on floor 10F as suggested in FIGS. 11-14 to retain first rear console CR1 in a stationary position on floor 10F. Second rear console CR1 can be anchored to floor 10F in the same way.

Each console anchor 20 comprises a front mount 20F coupled to floor 10F and rear mount 20R coupled to floor 10F and arranged to lie in spaced-apart relation to front mount 20F as shown, for example, in FIG. 11. Anchor connector 18 is configured to provide means for releasably mating with the companion front and rear mounts 20F, 20R as suggested diagrammatically in FIG. 11 and illustratively in FIGS. 12-14. Each mount 20F, 20R could be a U-hook as shown in FIG. 11 or another suitable structure coupled to floor 10F or any other nearby feature.

Figure 12:
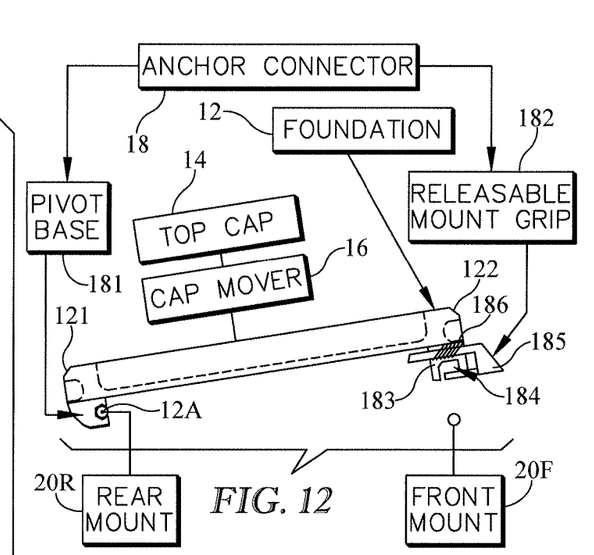
FIGS. 12-14 shows a sequence in which an illustrative console anchor made in accordance with the present disclosure is pivoted (by a passenger) in a clockwise direction about a stationary rear mount of the console anchor to engage a companion front mount of the console anchor to establish an anchored position of the foundation included in the console.
Figure 13:
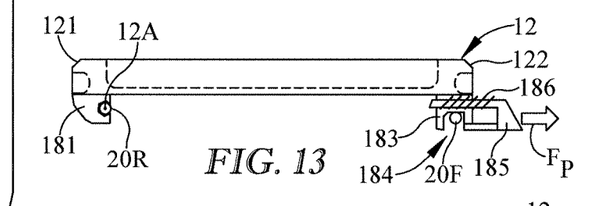
Figure 14:
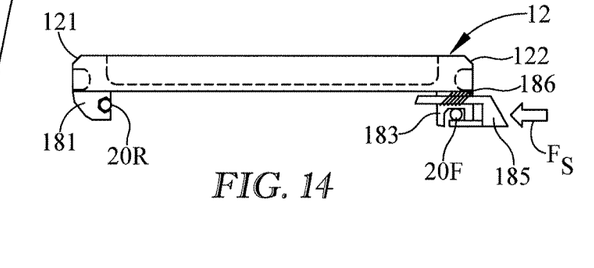

Three console-anchoring steps in accordance with the present disclosure are illustrated in FIGS. 12-14. As suggested in FIG. 12, a pivot base 181 of anchor connector 18 is mated with rear mount 20R of console anchor 20 to cause a releasable mount grip 182 of anchor connector to overlie front mount 20F of console anchor 20. Releasable mount grip 182 comprises a clamp base 183, a movable clamp 185 mounted for movement relative to clamp base 183 to open and close a mount-receiver space 184 provided therebetween, and a clamp-biasing spring 186 acting between clamp base 183 and movable clamp 185. As suggested in FIG. 13, a passenger or other operator applies a pulling force Fp to movable clamp 185 to move clamp 185 away from clamp base 183 to open mount-receiver space 184 and then pivots foundation 12 in a clockwise direction about a horizontal pivot axis 12A associated with rear mount 20R while continuing to apply pulling force Fp until a horizontally extending bar 20FB of front mount 20F lies in mount-receiver space 184. Then, as suggested in FIG. 14, the passenger or operator releases movable clamp 185 to allow a spring force FS to move movable clamp 185 toward clamp base 183 and trap horizontally extending bar 20FB of front mount 20F in mount-receiving space 184 between clamp base 183 and movable clamp 185. This clamping action causes the spring-loaded clamp 185 to contain front mount 20F and secure foundation 12 of the collapsible first rear console CR1 in a stationary position on floor 10F as suggested in FIGS. 1 and 14.

Top cap 14 includes a lid frame 144 and a lid 146 mounted on lid frame 144 to be opened and closed as suggested in FIGS. 9 and 10 by a passenger or operator to control access to an interior item-storage region 13 provided in first rear console CR1 as suggested in FIGS. 3, 9, and 10 when that console CR1 is placed in console mode. In an illustrative embodiment, lid 146 includes a closure 146C and a closure hinge 146H configured to provide means for supporting closure 146C for pivotable movement about a horizontal pivot axis 146A between an opened position suggested in FIG. 9 and a closed position suggested in FIG. 10.

Each of the rear consoles CR1, CR2 in accordance with the present disclosure are collapsible when not in use to allow walking between seats. Lid 146 of top cap 14 is hinged to keep items (not shown) in interior item-storage region 13 of a rear console CR1 and CR2. Covered pop-off pass-through and side-hooks 19 are provided as shown, for example, in FIG. 9 to allow plastic bags 19B to be attached for garbage collection. Each of linkage stabilizers 161S, 162S is a hinged bar that functions in accordance with the present disclosure to provide: (1) strong support for other console components when installed to establish the console mode of the console, (2) carrying handle(s) 16H in the picnic mode of the console, (3) and snap into top cap 14 when the console is in the step-over (pass-through) mode of the console. Sides of each console CR1, CR2 are made, for example, of thin plastic or canvas or other similar pliable but sturdy material and can be snap-connected or otherwise coupled temporarily to linkage stabilizers 161S, 162S in console mode to rigidify the console.

Figure 15:
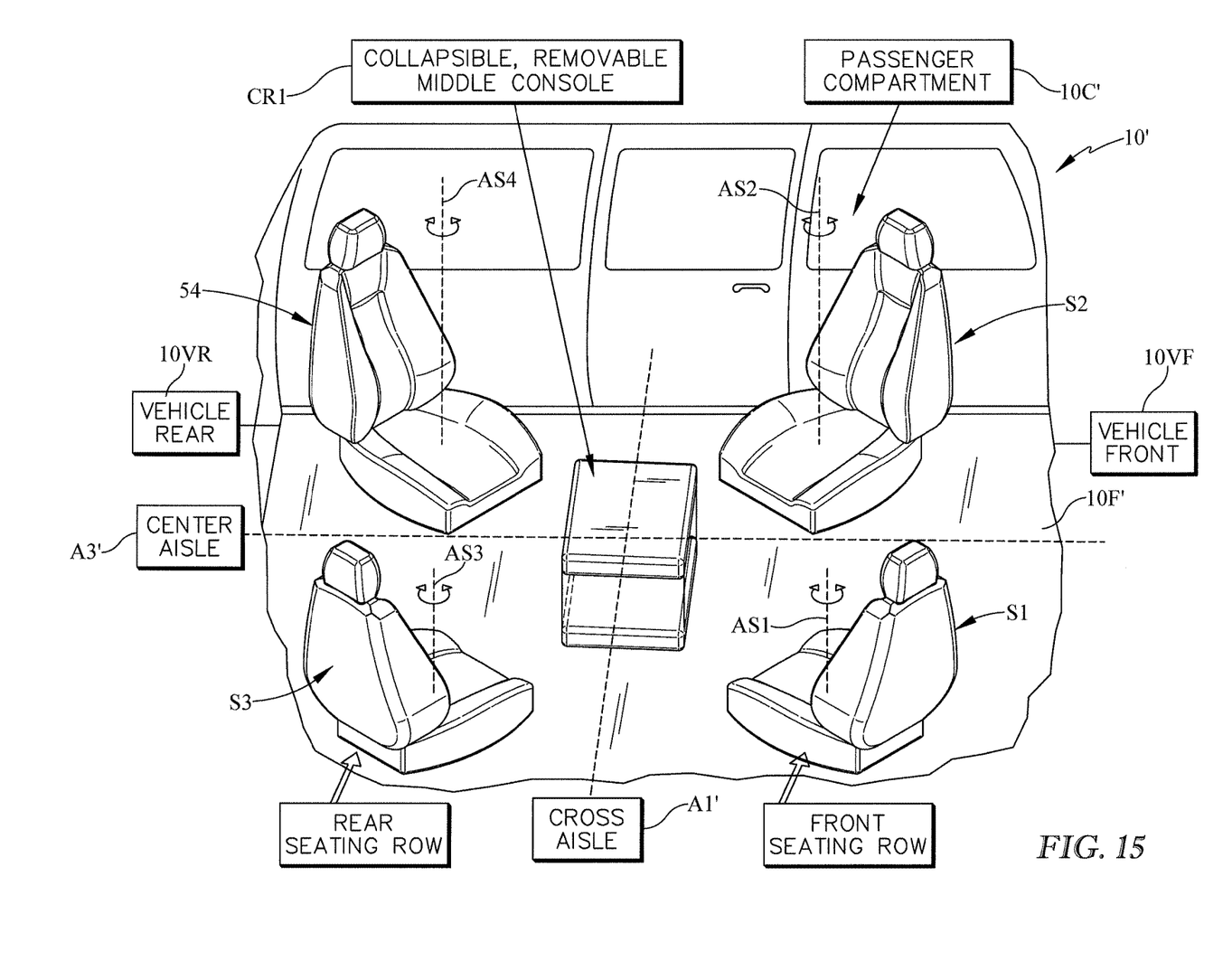
FIG. 15 is a diagrammatic perspective view of another passenger compartment in a vehicle showing that a collapsible middle console in accordance with the present disclosure is retained in a stationary position on a seat-supporting floor of the vehicle in a location at an intersection of a center aisle and a cross aisle in the vehicle after the four seats in the passenger compartment have been rotated about vertical axes of rotation to assume a conversational orientation facing toward the collapsible middle console.

A passenger compartment 10C' in a vehicle 10' is shown in FIG. 15 and comprises a floor 10F' and four swivel seats S1, S2, S3, and S4. Seats S1, S2 lie in a first seating row and seats S3, S4 lie in a second row. First seat S1 can swivel about axis of rotation AS1 as suggest in FIG. 15. Second seat S2 can swivel about axis of rotation AS2. Third seat S3 can swivel about axis of rotation AS3. Fourth seat S4 can swivel about axis of rotation AS4.

In a conversation seating mode shown, for example, in FIG. 15, seats S1-S4 are swiveled to face one another. These seats S1-S4 are separated by a center aisle A3' and a cross aisle A1'. In the illustrated embodiment, first rear console CR1 is retained in a stationary position on floor 10F' to lie at an intersection of the cross and center aisles A1', A3'. It is within the scope of the present disclosure to retain first rear console CR1 in another position on floor 10F' when the rotational orientation of seats S1-S4 is changed.

The invention claimed is:

1. A vehicle passenger compartment comprising
a seat-supporting floor,
a passenger-seating system lying above the seat-supporting floor and including a front seating row comprising first and second front seats coupled to the seat-supporting floor and arranged to lie in laterally spaced-apart relation to one another to define a front console-receiving space therebetween and a first rear seating row lying aft of the front seating row and comprising first and second rear seats coupled to the seat-supporting floor and arranged to lie in laterally spaced-apart relation to one another to define a first rear console-receiving space therebetween, and
a console system including a rigid front console mounted in a stationary position in the front console-receiving space to provide a barrier arranged to hinder movement of an occupant using the passenger-seating system along the seat-supporting floor through the front console-receiving space and a collapsible first rear console located in the first rear console-receiving space provided between the first and second rear seats, the collapsible first rear console including a foundation, a movable top cap, and cap mover means for selectively moving the movable top cap relative to the foundation and the seat-supporting floor under the foundation at the option of a console shape-change operator between an elevated position lying in spaced-apart relation to the seat-supporting floor to establish an expanded-use configuration of the collapsible first rear console that provides a barrier to hinder movement of an occupant using the passenger seating system along the seat-supporting floor through the first rear console-receiving space and a collapsed low-profile position lying along the seat-supporting floor to establish a collapsed compact-storage configuration of the collapsible first rear console to provide an occupant transit passageway between the first and second rear seats to allow free pass-through movement of an occupant using the passenger seating system through the first rear console-receiving space along the seat-supporting floor above the top cap.

2. The vehicle passenger compartment of claim 1, wherein the passenger seating system further includes a second rear seating row arranged to lie in spaced-apart relation to the front seating row to locate the first rear seating row therebetween, the second rear seating row comprises third and fourth rear seats coupled to the seat-supporting floor and arranged to lie in laterally spaced-apart relation to one another to define a second rear console-receiving space therebetween and wherein the console system further includes a collapsible second rear console located in the second rear console-receiving space provided between the third and fourth rear seats, the collapsible second rear console including a second foundation, a movable second top cap, and means for selectively moving the movable second top cap relative to the second foundation between an elevated position lying in spaced-apart relation to the seat-supporting floor to establish an expanded-use configuration of the collapsible second rear console that provides a barrier to hinder movement of an occupant using the passenger seating system along the seat-supporting floor through the second rear console-receiving space and a collapsed low-profile position lying along the seat-supporting floor to establish a collapsed compact-storage configuration of the collapsible second rear console to provide an occupant transit passageway between the third and fourth rear seats to allow free pass-through movement of an occupant using the passenger seating system through the second rear console-receiving space along the seat-supporting floor above the second top cap.

3. The vehicle passenger compartment of claim 1, wherein the cap mover means includes a first-end fold linkage having a top mount pivotably coupled to a first end of the top cap and a bottom mount pivotably coupled to a companion first end of the foundation that is arranged to lie in close proximity to the first end of the top cap upon movement of the top cap to the collapsed low-profile position, the top and bottom mounts are separated by a first distance when the top cap occupies the elevated position and a relatively shorter second distance when the top cap occupies the collapsed low-profile position, and the cap mover means further include a first linkage stabilizer having a free end and an opposite pivot end mounted on the first end of the top cap for pivotable movement about a first horizontal pivot axis between a first linkage-stabilizing position in which the free end engages the first end of the foundation to rigidify the first-end fold linkage and retain the top cap in the elevated position and other positions in which the free end disengages the first end of the foundation to unrigidify the first-end fold linkage to allow downward movement of the top cap from the elevated position to the collapsed low-profile position.

4. The vehicle passenger compartment of claim 3, wherein the free end of the first linkage stabilizer is arranged to lie in spaced-apart relation to the foundation in one of the other positions to locate the top cap therebetween and provide a carry handle located above the top cap.

5. The vehicle passenger compartment of claim 3, wherein the free end of the first linkage stabilizer is arranged to extend into an end-receiver channel formed in the top cap when the top cap occupies the collapsed low-profile position.

6. The vehicle passenger compartment of claim 3, wherein the first-end fold linkage includes a top link and a bottom link, the top link includes the top mount at one end and a pivot mount in an opposite end, the bottom link includes the bottom mount at one end and a pivot mount at an opposite end, the pivot mounts are coupled to one another to support the top and bottom links for pivotable movement relative to one another about a horizontal link-pivot axis to allow movement of the top mount relative to the bottom mount during movement of the top cap relative to the foundation.

7. The vehicle passenger compartment of claim 6, wherein the top and bottom links are arranged to extend along a line and lie in in-line relation to one another when the top cap occupies the elevated position, to establish a first V-shape and cooperate to form a first acute angle therebetween having a first measure when the top cap is located part way between the elevated and collapsed low-profile positions, and to establish a second V-shape and cooperate to form a second acute angle therebetween having a relatively smaller second measure when the top cap occupies the collapsed low-profile position.

8. The vehicle passenger compartment of claim 6, wherein the top link has a first length, the bottom link also has a length that is the same as the first length, and the first linkage stabilizer has a relatively longer second length.

9. The vehicle passenger compartment of claim 6, wherein the first linkage stabilizer has a length that is longer than a combined length of the top and bottom links when the top and bottom links are arranged to extend along a line and lie in an in-line relation to one another when the top cap occupies the elevated position.

10. The vehicle passenger compartment of claim 3, wherein each of the top cap and the foundations includes a second end opposite to the first end, the pivot end of the first linkage stabilizer is arranged to lie on the first end of the top cap in a location between the top mount of the first-end fold linkage and the second end of the top cap, and the bottom mount of the first-end fold linkage is arranged to lie on the first end of the foundation in a location between the free end of the first linkage stabilizer and the second end of the foundation when the free end of the first linkage stabilizer engages the first end of the foundation and the top cap occupies the elevated position.

11. The vehicle positioner compartment of claim 10, wherein the first-end fold linkage extends coextensively along a vertical line and the first linkage stabilizer extends along a positively sloping line when the top cap occupies the elevated position.

12. The vehicle passenger compartment of claim 3, wherein the cap mover means further includes a second-end fold linkage having a top mount pivotably coupled to a second end of the top cap and a bottom mount pivotably coupled to a companion second end of the foundation that is arranged to lie in close proximity to the second end of the top cap upon movement of the top cap to the collapsed low-profile position, the top and bottom mounts are separated by a first distance when the top cap occupies the elevated position and a relatively shorter second distance when the top cap occupies the collapsed low-profile position, and the cap mover means further include a second linkage stabilizer having a free end and an opposite pivot end mounted on the second end of the top cap for pivotable movement about a second horizontal pivot axis between a second linkage-stabilizing position in which the free end engages the second end of the foundation to rigidify the second-end fold linkage and retain the top cap in the elevated position and other positions in which the free end disengages the second end of the foundation to unrigidify the second-end fold linkage to allow downward movement of the top cap from the elevated position to the collapsed low-profile position.

13. The vehicle passenger compartment of claim 11, wherein the free end of the second linkage stabilizer is arranged to lie in spaced-apart relation to the foundation in one of the other positions to locate the top cap therebetween and cooperate with the free end of the first linkage stabilizer to provide a carry handle located above the top cap.

14. The vehicle passenger compartment of claim 12, wherein the free end of the second linkage stabilizer is arranged to extend into an end-receiver channel formed in the top cap when the top cap occupies the collapsed low-profile position.

15. The vehicle passenger compartment of claim 1, wherein the console system further includes a first console anchor mounted in a stationary position on the seat-supporting floor and the collapsible first rear console further includes a releasable anchor connector coupled to the foundation and configured to provide connector means for engaging the first console anchor to locate the foundation in a stationary position in the first rear console-receiving space relative to the seat-supporting floor and for disengaging the first console anchor at the option of an occupant using the passenger-seating system to free the foundation to be moved from the stationary position on the seat-supporting floor so that the collapsible first rear console can be relocated to a new position relative to the seat-supporting floor.

16. The vehicle passenger compartment of claim 15, wherein the first console anchor includes a front mount coupled to the floor and a rear mount coupled to the floor and arranged to lie in spaced-apart relation to the front mount and the anchor connector of the first rear console engages the front and rear mounts to locate and retain the foundation in the stationary position in the first rear console-receiving space.

17. The vehicle passenger compartment of claim 16, wherein the vehicle passenger compartment is provided in a vehicle having a vehicle front and an opposite vehicle rear, the front mount is located between the rear mount and the vehicle front, and the rear mount is located between the vehicle rear and the front mount.

18. The vehicle passenger compartment of claim 16, wherein a center aisle is arranged to extend between the first and second front seats and between the first and second rears along a path between the vehicle front and the vehicle rear, and each of the front mount, rear mount, and occupant transit passageway are located in the center aisle.

19. The vehicle passenger compartment of claim 15, wherein the anchor connector includes a pivot base coupled to the foundation to move therewith and releasably mounted on the rear mount for temporary pivotable movement about a horizontal pivot axis during engagement of the anchor connector to the front mount and a releasable mount grip coupled to the foundation to move therewith and adapted to engage the front mount during engagement of the anchor connector to the rear and front mounts.

20. The vehicle passenger compartment of claim 19, wherein the releasable mount grip includes a clamp base coupled to the foundation to move therewith, a movable clamp mounted for movement relative to the clamp base to open and close a mount-receiver space provided between the clamp base and the movable clamp, and a clamp-biasing spring acting between the clamp base and the movable clamp to provide means for moving the movable clamp toward the clamp base to trap a bar portion of the front mount located in the mount-receiver space to retain the foundation in the stationary position on the seat-supporting floor after the pivot base has pivoted on a bar portion of the rear mount to move the releaseable mount grip downwardly toward the front mount and the movable clamp has been moved away from the clamp base against a biasing force provided by the clamp-biasing spring to open the mount-receiver space to place the bar portion of the front mount in the mount-receiver space.

21. The vehicle passenger compartment of claim 19, wherein the pivot base is formed to include a bar-receiving channel opening toward the releasable mount grip and sized to receive the bar portion of the rear mount therein.

22. The vehicle passenger compartment of claim 19, wherein the pivot base is mounted on a first end of the foundation and arranged to extend downwardly away from the top cap and the releasable mount grip is mounted on an opposite second end of the foundation and arranged to extend downwardly away from the top cap.

23. The vehicle passenger compartment of claim 1, wherein the top cap includes a lid frame and a lid mounted for movement relative to the lid frame to open and close an aperture opening into an interior item-storage region formed in the collapsible first rear console, the cap mover means includes a first-end fold linkage having a top mount pivotably coupled to a first end of the lid frame of the top cap and a bottom mount pivotably coupled to a companion first end of the foundation that is arranged to lie in close proximity to the first end of the top cap upon movement of the top cap to the collapsed low-profile position and the cap mover means further includes a first linkage stabilizer having a free end and an opposite pivot end mounted on the first end of the lid frame of the top cap for pivotable movement about a first horizontal pivot axis between a linkage-stabilizing position in which the free end engages the first end of the foundation to rigidify the first-end fold linkage and retain the top cap in the elevated position and other positions in which the free end disengages the first end of the foundation to unrigidify the first-end fold linkage to allow downward movement of the top cap from the elevated position to the collapsed low-profile position.

24. The vehicle passenger compartment of claim 23, wherein the free end of the first linkage stabilizer is arranged to extend into an end-receiver channel formed in the lid of the top cap when the top cap occupies the collapsed low-profile position to retain the lid in a closed position on the lid frame.

25. The vehicle passenger compartment of claim 24, wherein the end-receiver channel formed in the lid is oriented to open upwardly away from the foundation.

* * * * *